(12) United States Patent
Lai et al.

(10) Patent No.: US 11,176,355 B2
(45) Date of Patent: Nov. 16, 2021

(54) FACIAL IMAGE PROCESSING METHOD AND APPARATUS, ELECTRONIC DEVICE AND COMPUTER READABLE STORAGE MEDIUM

(71) Applicant: BEIJING MICROLIVE VISION TECHNOLOGY CO., LTD, Beijing (CN)

(72) Inventors: Jinfeng Lai, Beijing (CN); Youwen Zhuang, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/018,835

(22) Filed: Sep. 11, 2020

(65) Prior Publication Data

US 2020/0410211 A1    Dec. 31, 2020

Related U.S. Application Data

(63) Continuation of application No. PCT/CN2019/073071, filed on Jan. 25, 2019.

(30) Foreign Application Priority Data

Jun. 13, 2018  (CN) .......................... 201810609994.5

(51) Int. Cl.
  *G06K 9/00* (2006.01)
  *G06T 7/50* (2017.01)
  *G06T 5/20* (2006.01)

(52) U.S. Cl.
  CPC ..... *G06K 9/00228* (2013.01); *G06K 9/00268* (2013.01); *G06T 5/20* (2013.01); *G06T 7/50* (2017.01); *G06T 2207/30201* (2013.01)

(58) Field of Classification Search
  None
  See application file for complete search history.

(56) References Cited

U.S. PATENT DOCUMENTS

| 2003/0123713 | A1* | 7/2003 | Geng ................ G06K 9/00288 382/118 |
| 2006/0098889 | A1* | 5/2006 | Luo ...................... G06T 11/001 382/254 |

(Continued)

FOREIGN PATENT DOCUMENTS

| CN | 107509031 A | 12/2017 |
| CN | 107862274 A | 3/2018 |

(Continued)

OTHER PUBLICATIONS

International Patent Application No. PCT/CN2019/073071; Int'l Search Report; dated Apr. 24, 2019; 2 pages.

(Continued)

*Primary Examiner* — Bernard Krasnic
(74) *Attorney, Agent, or Firm* — BakerHostetler

(57) ABSTRACT

A facial image processing method and apparatus, an electronic device and a computer readable storage medium. The facial image processing method comprises: acquiring an image to be processed; detecting whether a facial image exists in the image to be processed; in response to the detected facial image, carrying out a first processing on the facial image to obtain a first image; and obtaining depth information, and adding the depth information to the first image to obtain a processed image. According to the method, the image depth information can be added after the image is processed, such that the image has a stereoscopic impression and the user operation is simplified.

20 Claims, 8 Drawing Sheets

(56) References Cited

U.S. PATENT DOCUMENTS

| | | | | |
|---|---|---|---|---|
| 2009/0169095 A1* | 7/2009 | Zhuang | .............. | G01B 11/2545 |
| | | | | 382/154 |
| 2013/0051659 A1* | 2/2013 | Yamamoto | ........... | H04N 13/261 |
| | | | | 382/154 |
| 2013/0089268 A1* | 4/2013 | Nguyen | .................. | G06T 5/004 |
| | | | | 382/260 |
| 2013/0235033 A1* | 9/2013 | Kim | .................. | G06K 9/00208 |
| | | | | 345/419 |
| 2015/0363636 A1* | 12/2015 | Tate | .................. | G06K 9/00295 |
| | | | | 382/103 |
| 2019/0080508 A1* | 3/2019 | Johnson | ........... | H04N 5/232939 |
| 2019/0164341 A1* | 5/2019 | Venkataraman | ........ | G06T 7/149 |

FOREIGN PATENT DOCUMENTS

| | | |
|---|---|---|
| CN | 107862657 A | 3/2018 |
| CN | 108830892 A | 11/2018 |
| JP | 2017-121044 A | 7/2017 |
| KR | 10-1279561 B1 | 6/2013 |

OTHER PUBLICATIONS

Yi Tu; "3D Face Model Reconstruction for Face Recognition"; A Dissertation Presented by Shanghai Jiao Tong University; Nov. 2008; 72 pages (English Abstract pp. 6 and 7).

\* cited by examiner

FACIAL IMAGE PROCESSING METHOD AND APPARATUS, ELECTRONIC DEVICE AND COMPUTER READABLE STORAGE MEDIUM

RELATED APPLICATION

This application is a continuation of International Patent Application No. PCT/CN2019/073071, filed on Jan. 25, 2019, which claims priority to Chinese Patent Application No. 201810609994.5, titled "FACIAL IMAGE PROCESSING METHOD AND APPARATUS, ELECTRONIC DEVICE AND COMPUTER READABLE STORAGE MEDIUM", filed on Jun. 13, 2018 with the Chinese Patent Office, both of which are incorporated herein by reference in their entireties.

FIELD

The present disclosure relates to the field of image processing, and in particular to a face image processing method, a face image processing apparatus, an electronic device, and a computer readable storage medium.

BACKGROUND

With the development of computer technologies, smart terminals are widely used in more and more areas. For example, the smart terminal can be used to listen to music, play games, chat online, and take pictures. Especially, the cameras of the smart terminals have more than 10 million pixels, with high definition and the camera effect comparable to professional cameras.

At present, a smart terminal, when used to take pictures, not only can perform the function of a traditional camera by using the camera software built-in at the factory, but also can achieve additional photographic effects by using applications (abbreviated as APP) that is downloaded from the network, such as the APPs that can realize dark light detection, beauty camera, and super pixel functions. The smart terminals can achieve beauty camera functions such as skin tone adjustment, skin grinding, big eyes effect and face-lifting and other beauty effects, and can apply the same degree of beauty effect on faces that are identified in an image.

SUMMARY

However, the conventional beauty effect is achieved based on face information of a user collected by an image sensor of a terminal device, that does not have a depth sensing function. Even with an image sensor having the depth sensing function, depth information of a face in a three-dimensional space cannot be maintained after the beauty effect is applied to the face image, resulting in that an obtained image does not have a three-dimensional pattern.

Therefore, a face image processing method that can obtain both the beauty effect and a three-dimensional effect may greatly improve user experience.

In view of the above, a face image processing method is provided according to an embodiment of the present disclosure, with which different beauty effects can be combined with depth information, to obtain a three-dimensional beauty effect.

In a first aspect, a face image processing method is provided according to an embodiment of the present disclosure. The method includes:

obtaining a to-be-processed image;

determining if a face image is detected in the to-be-processed image;

in response to a detected face image, performing first processing on the face image, to obtain a first image; and obtaining depth information, and adding the depth information to the first image, to obtain a processed image.

Optionally, before the performing first processing on the face image, the method may further include: determining a face image region on which the first processing is to be performed.

Optionally, the determining a face image region on which the first processing is to be performed may include: selecting a face region that is to be deleted; deleting the selected face region; and determining a remaining face region after the deleting is performed as the face image region on which the first processing is to be performed.

Optionally, the performing first processing on the face image, to obtain a first image may include: performing low-pass filtering on the face image, to obtain a low frequency component of the face image; subtracting the low frequency component from the face image, to obtain a high frequency component of the face image; and amplifying the high frequency component to obtain the first image.

Optionally, the low-pass filtering may include: calculating an average value of a value of a current pixel and values of adjacent pixels surrounding the current pixel in the face image, and using the average value as the value of the current pixel.

Optionally, the calculating the average value may include: obtaining a smoothing matrix, and convolving the value of the current pixel and the values of the adjacent pixels surrounding the current pixel in the face image with the smoothing matrix, to obtain the average value.

Optionally, the smoothing matrix may be a two-dimensional matrix, and elements in the two-dimensional matrix may be arranged in a manner that values of the elements decreases from a center to a periphery of the two-dimensional matrix.

Optionally, the obtaining depth information, and adding the depth information to the first image, to obtain a processed image may include: obtaining a feature point of the face image; obtaining depth information of the feature point of the face image from a preset standard template; and mapping the depth information to the feature point of the face image, to obtain the processed image.

Optionally, the obtaining depth information of the feature point of the face image from a preset standard template may include: determining a first standard template among preset standard templates, wherein coordinates of a feature point in the first standard template satisfies a preset relationship with coordinates of the feature point of the face image; and determining the depth information of the feature point of the face image based on the depth information of the feature point in the first standard template.

In a second aspect, a face image processing apparatus is provided according to an embodiment of the present disclosure. The apparatus includes: an image obtaining module, a detection module, a first processing module, and a depth module.

The image obtaining module is configured to obtain a to-be-processed image.

The detection module is configured to determine if a face image is detected in the to-be-processed image.

The first processing module is configured to, in response a detected face image, perform a first processing on the face image, to obtain a first image.

The depth module is configured to obtain depth information, and add the depth information to the first image, to obtain a processed image.

Optionally, the face image processing apparatus may further include: a determination module configured to determine a face image region on which the first processing is to be performed.

Optionally, the determination module may include a to-be-deleted region selection module, a deletion module, a determination sub-module. The to-be-deleted region selection module is configured to select a face region that is to be deleted. The deletion module is configured to delete the selected face region. The determination sub-module is configured to determine a remaining face region after the deleting is performed as the face image region on which the first processing is to be performed.

Optionally, the first processing module may include: a low-frequency component module, a high-frequency component module, and an amplification module. The low-frequency component module is configured to perform low-pass filtering on the face image, to obtain a low frequency component of the face image. The high-frequency component module is configured to subtract the low frequency component from the face image, to obtain a high frequency component of the face image. The amplification module is configured to amplify the high frequency component to obtain the first image.

Optionally, the low-frequency component module may include: an average value calculation module configured to calculate an average value of a value of a current pixel and values of adjacent pixels surrounding the current pixel in the face image, and use the average value as the value of the current pixel.

Optionally, the average value calculation module may include a smoothing matrix calculation unit configured to convolve the value of the current pixel and the values of the adjacent pixels surrounding the current pixel in the face image with the smoothing matrix, to obtain the average value.

Optionally, the smoothing matrix may be a two-dimensional matrix, and elements in the two-dimensional matrix may be arranged in a manner that values of the elements decreases from a center to a periphery of the two-dimensional matrix.

Optionally, the depth module may include a feature point obtaining module, a depth information obtaining module, and a mapping module. The feature point obtaining module is configured to obtain a feature point of the face image. The depth information obtaining module is configured to obtain depth information of the feature point of the face image from a preset standard template. The mapping module is configured to map the depth information to the feature point of the face image, to obtain the processed image.

Optionally, the depth information obtaining module may include a standard template determination module and a depth information obtaining sub-module. The standard template determination module is configured to determine a first standard template among preset standard templates, where coordinates of a feature point in the first standard template satisfies a preset relationship with coordinates of the feature point of the face image. The depth information obtaining sub-module is configured to obtain the depth information of the feature point in the first standard template.

In a third aspect, an electronic device is provided according to an embodiment of the present disclosure. The electronic device includes:

at least one processor; and a memory in communicational connection with the at least one processor.

The memory stores instructions executable by the at least one processor, and the instructions, when executed by the at least one processor, cause the at least one processor to perform the face image processing method according to any one of the first aspect.

In a fourth aspect, a non-transient computer-readable storage medium is provided according to an embodiment of the present disclosure. The non-transient computer-readable storage medium stores computer instructions, the computer instructions are configured to cause a computer to perform the face image processing method according to any one of the first aspect.

A face image processing method, a face image processing apparatus, an electronic device, and a computer readable storage medium are provided according to the embodiments of the present disclosure. The face image processing method includes: obtaining a to-be-processed image; determining if a face image is detected in the to-be-processed image; in response to a detected face image, performing first processing on the face image, to obtain a first image; and obtaining depth information, and adding the depth information to the first image, to obtain a processed image. With the technical solution of the embodiments of the present disclosure, the problem in the conventional technology that an image appears unrealistic due to image information loss after image processing can be solved. Image depth information is added to a processed image through a simple user operation, such that the image have a three-dimensional effect.

The above description is only an overview of the technical solutions of the present disclosure. In order to better understand the technical means of the present disclosure, such that the technical means of the present disclosure can be implemented in accordance with the contents of the description, and in order to make the above and other objects, features, and advantages of the present disclosure more understandable, the following describes the preferred embodiments in detail with reference to the drawings.

BRIEF DESCRIPTION OF THE DRAWINGS

The drawings to be used in the description of the embodiments of the present disclosure or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION

The following describes the embodiments of the present disclosure through specific examples. Those skilled in the art can easily understand other advantages and effects of the present disclosure from the content disclosed in this specification. Obviously, the described embodiments are only a few rather than all of the embodiments according to the present disclosure. The present disclosure can also be implemented or applied through other different specific implementations or applied through other different specific implementations, and various details in this specification can also be modified or changed based on different viewpoints and applications without departing from the spirit of the present disclosure. It should be noted that, in the case of no conflict, the following embodiments and features in the embodiments can be combined with each other. Based on the embodiments in the present disclosure, all other embodiments obtained by a person of ordinary skill in the art without creative efforts shall fall within the protection scope of the present disclosure.

It should be noted that various aspects of the embodiments within the scope of the appended claims are described below. It should be apparent that the aspects described herein may be embodied in a wide variety of forms and that any specific structure and/or function described herein is merely illustrative. Based on the present disclosure, those skilled in the art should understand that one aspect described herein may be implemented independently of any other aspect, and that two or more of these aspects may be combined in various ways. For example, any number of the aspects set forth herein may be used to implement a device and/or a practice method. In addition, the apparatus and/or the method may be implemented using other structures and/or functionality in addition to one or more of the aspects set forth herein.

It should also be noted that the drawings provided in the following embodiments only schematically illustrate the basic idea of the present disclosure. The drawings show only the components related to the present disclosure and are not drawn according to the numbers, shapes and sizes of components in actual implementation. The shapes, numbers, and scales of components may be randomly changed, and the components may have a more complex layout in actual implementation.

In addition, in the following description, specific details are provided to facilitate a thorough understanding of the examples. However, those skilled in the art will understand that the described aspects may be practiced without these specific details.

Figure 1:
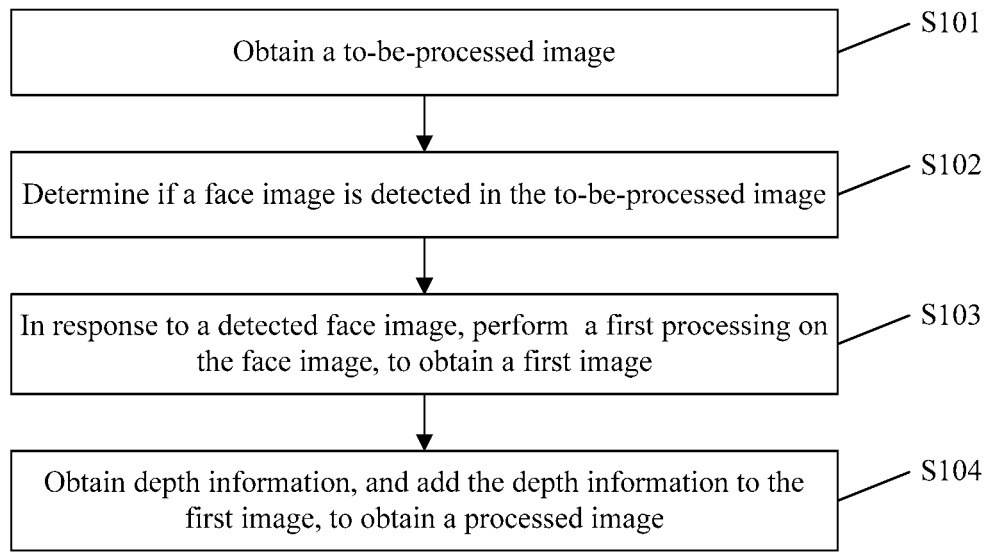
FIG. 1 is a flow chart of a face image processing method according to a first embodiment of the present disclosure.

FIG. 1 is a flowchart of a face image processing method according to a first embodiment of the present disclosure. The face image processing method according to this embodiment may be performed by a face image processing apparatus. The face image processing apparatus may be implemented as software or as a combination of software and hardware. The face image processing apparatus may be integrated in a device in an image processing system, such as an image processing server or an image processing terminal device. As shown in FIG. 1, the method includes the following steps S101 to S104.

In step S101, a to-be-processed image is obtained.

In order to implement the processing of different images, the to-be-processed image may be a picture or a video, which may include any kinds of information, such as depth information, textures, and the like. The to-be-processed image may be obtained from the network or through a local image sensor. A typical application scenario of obtaining the to-be-processed image from the network is monitoring, where a terminal may receive an image from a network monitoring system and process the image. A typical application scenario of obtaining the to-be-processed image through a local image sensor is selfie, where a user takes a photo or a video of himself/herself by using a front camera of a mobile phone, and the mobile phone may process the photo or the video.

In step S102, it is determined if a face image is detected in the to-be-processed image.

It is detected if the to-be-processed image includes a face image. Face detection is a process of searching an image or a sequence of images by using a certain strategy to determine a position or a region of a face. Various images or image sequences may be detected to determine if a face exists, and to determine the number and spatial distribution of faces. Generally, a face is detected by using the following 4 methods: (1) knowledge-based method, (2) feature invariant method, (3) template matching method, and (4) appearance-based method. In the knowledge-based method, typical faces are coded to form a rule library, such that a face can be located based on relationships between face features. In the feature invariant method, stable features are determined in a condition that postures, viewing angles, or lighting conditions changes, and these features are used to determine a face. In the template matching method, several standard face patterns for describing the entire face and facial features are stored, and a correlation between an inputted image and a stored pattern is calculated and used for detection. The appearance-based method is opposite from the template matching method in that, models are obtained by learning from a training image set, and are used for detection. In the following, an implementation of using the method (4) is described to explain the face detection process. First, features are extracted for modeling. In this embodiment, Haar features are used as key features for determining a face. Haar features are simple rectangular features that can be extracted at a high speed. A feature template for calculating general Haar features is a simple rectangle combination consisting of two or more congruent rectangles, and the rectangles include black rectangles and white rectangles. Next, the AdaBoost algorithm is used to find key features among a large number of Haar features, and an effective classifier is generated by using these key features. The generated classifier may be used to detect a face in an image. There may be one or more faces in the image in this embodiment.

It should be understood that, in a case that multiple face images are recognized in the image, the user may select one face image to be processed, or the user may select multiple face images, and perform the same or different processing on the face images.

It should be understood that, since various face detection algorithms have respective advantages and different application areas, multiple different detection algorithms may be set to automatically adapt to different environments. For example, in an image having a simple background environment, a faster algorithm with a lower detection rate may be used, while in an image with a complex background environment, a slower algorithm with a higher detection rate may be used. For the same image, multiple detections may be performed by using multiple algorithms to increase the detection rate.

In step S103, in response to a detected face image, first processing is performed on the face image to obtain a first image.

When a face image is detected in the image, the first processing is performed on the detected face image to obtain a first image. The first processing may be pre-processing of the image or processing having special effects. For example, the first processing may include matting, blurring, and sharpening processing on a face, so as to highlight the advantages and dilute the defects on the face, to achieve a beauty effect. The first image obtained in this step is a two-dimensional image that does not include depth information regardless of the type of the image.

In step S104, depth information is obtained and is added to the first image, to obtain a processed image.

In an embodiment of the present disclosure, the depth information may be obtained in any one of the following manners (1) to (3): (1) By using a preset depth information template, wherein the template is a standard image including depth information, and specifically, it may be a standard face image, where feature points of the standard face image contain depth information of the feature points. (2) Real-time calculation, wherein approximate values of the image depth is calculated by capturing images from multiple angles. (3) Estimating the depth value based on a model or prior knowledge, wherein approximate depth information of the total feature points is obtained by using, for example, a neural network and the like, and he depth information may be obtained locally or from a server, and the estimation process and the calculation process may be performed locally or in the cloud server. After the depth information is obtained, the depth information is brought into corresponding feature points in the first image to obtain the first image having depth information, that is, the processed image.

The core idea of this embodiment is: when it is detected that the image includes a face image, image processing is performed on the face image, and then depth information is added to the processed image. Specifically, the first processing and the operation of adding the depth information may be combined into a special filter or sticker, which is convenient for users to use. After the above-mentioned face image processing, the obtained image not only has the effect of the first processing, but also has depth information, so that the face image looks more realistic and stereoscopic.

Figure 2:
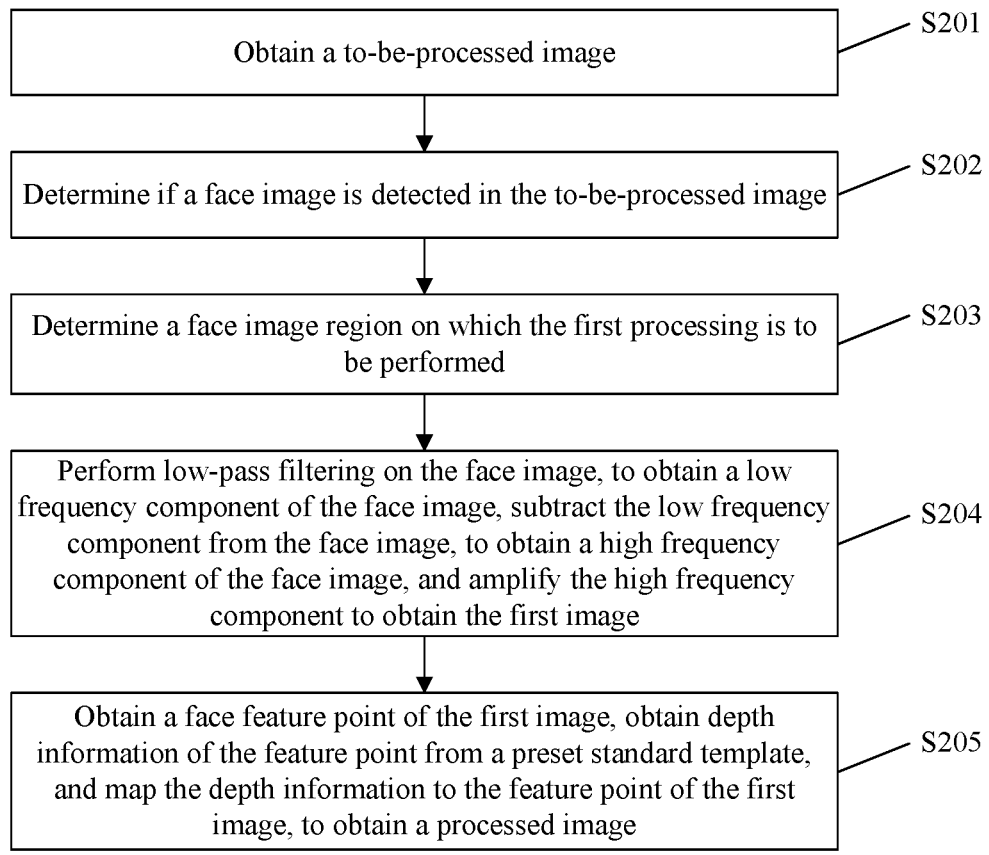
FIG. 2 is a flow chart of a face image processing method according to a second embodiment of the present disclosure.

FIG. 2 is a flow chart of a face image processing method according to a second embodiment of the present disclosure. As shown in FIG. 2, the method may include the following steps S201 to S205.

In step S201, a to-be-processed image is obtained.

In step S202, it is determined if a face image is detected in the to-be-processed image.

In step S203, a face image region on which the first processing is to be performed is determined.

In this embodiment, a user may select an image region to be processed. When an image is detected, multiple feature points are detected. Five sense organs and a face contour in the face image may be distinguished based on the feature points. The user may select a region to be processed. The selection may include directly selecting the region on which the first processing is to be performed, or may include selecting a remaining image region after matting is performed. In this embodiment, the image region on which the first processing is to be performed is selected in the matting manner. For example, the user may select not to process the nose region by cutting out the nose region, and performing the first processing on the remaining image region. It should be noted that this step may also be omitted to directly perform the first processing on the entire face image, that is, the entire face image may be selected for the first processing.

In step S204, low-pass filtering is performed on the face image, to obtain a low frequency component of the face image, the low frequency component is subtracted from the face image, to obtain a high frequency component of the face image, and the high frequency component is amplified to obtain the first image.

In this embodiment, the first processing first performing low-pass filtering on the image. The low-pass filtering may include calculating an average value of pixels. Specifically, for each pixel in the image, an average value of a value of the pixel and values of adjacent pixels surrounding the pixel is calculated, and the average value is used as the value of the pixel. The average value is calculated by using a smoothing matrix, that the value of the current pixel and the values of adjacent pixels surrounding the current pixel in the image are convolved with the smoothing matrix to obtain the average value. The smoothing matrix is a two-dimensional matrix, and elements in the two-dimensional matrix are arranged in a manner that values of the elements decreases from a center to a periphery of the two-dimensional matrix. It should be noted that the above low-pass filtering is merely an example, and any low-pass filtering method may be used in the present disclosure, and is not limited herein.

The high-frequency component of the face image is obtained by subtracting the low-pass filtered image from the face image. It is to be noted that, the high-frequency component does not include the nose region, which is deleted in the selection step and is not involved in the low-pass filtering. Therefore, the nose region is the original image. The high-frequency component is amplified to obtain the first image, at a ratio determined by the user through, for example, a slider control or a selection control. With the above first processing, processing of skin grinding and sharpening are performed on the face image, such that defects on the face of the user are weakened while advantages on the face of the user are emphasized. However, the image at this time is two-dimensional, and does not have a three-dimensional sense.

In step S205, a face feature point of the first image is obtained, depth information of the feature point is obtained from a preset standard template, and the depth information is mapped to the feature point of the first image, to obtain a processed image.

After the first image is obtained, the face feature point on the first image is obtained. The feature point is obtained by using a preset algorithm. The depth information of the feature point is obtained from a preset standard template. The standard template includes a standard face image and standard feature points on the face image, where the feature points include respective depth information and have respective numbers. The first image is divided in a same manner as that of the standard template, and each feature point in the first image has a corresponding feature point in the standard template. The depth information of the feature point in the standard template is mapped to the corresponding feature point in the first image, to obtain the processed image. There may be multiple standard templates, which may be face images captured at different angles, to adapt to faces of different angles in the image, so that the depth information is more accurate. In a case of multiple templates at different angles, the coordinates of the feature points are recorded. If coordinates of the feature point in the first image satisfies a predetermined relationship with the coordinates of the feature point in the standard template, the depth information of the feature point in the standard template is obtained, wherein the predetermined relationship may be that the difference between the coordinates of the feature point in the first image and the coordinates of the feature point in the standard template is within a threshold.

Figure 3:
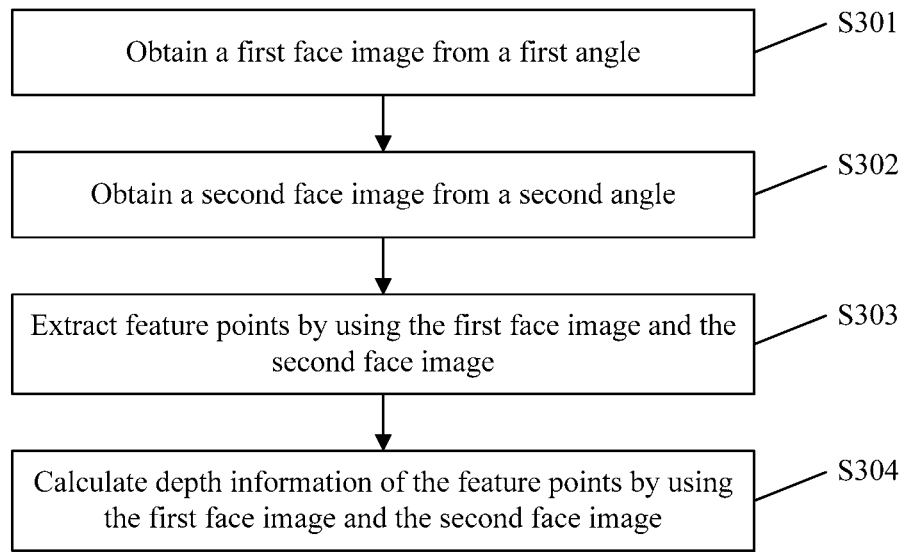
FIG. 3 is a flow chart of an optional implementation of step S104 in the embodiment shown in FIG. 1.

FIG. 3 is a flow chart of obtaining the depth information in the face image processing method according to an embodiment of the present disclosure. In this embodiment, the depth information is obtained based on the principle of binocular stereoscopic vision. The basic principle of binocular stereoscopic vision is to observe the same object from two viewpoints to obtain perceptual images at different perspectives, and then calculate the positional deviation between the pixels of the images by using triangulation to obtain the three-dimensional information of the object. As shown in FIG. 3, the obtaining the depth information may include the following steps S301 to S304.

In step S301, a first face image is obtained from a first angle.

In step S302, a second face image is obtained from a second angle.

In step S303, feature points are extracted by using the first face image and the second face image.

In step S304, depth information of the feature points is calculated by using the first face image and the second face image.

The positional deviation is calculated in the following manner. First, feature points in the image at the first angle are matched with feature points in the image at the second angle, to calculate the positional deviation between the feature points. In this embodiment, feature points are matched by using the SIFT algorithm in combination with the Harris algorithm, where the Harris algorithm is used to extract feature points to replace the extreme points of the SIFT algorithm, with steps including: obtaining a face image at a first angle, detecting a Harris feature point, calculating a main direction of the feature point and generating a first-angle SIFT descriptor, obtaining a face image at a second angle, detecting a Harris feature point, calculating a main direction of the feature point and generating a second-angle SIFT descriptor, comparing the two descriptors to determine whether the two feature points match with each other, calculating a deviation of the same feature point on these two images when these two feature points are determined to be matched with each other, and calculating the depth information of the point by using the deviation.

After the depth information of the feature point is obtained, the depth information is mapped to the corresponding feature point in the first image to obtain the processed image.

In an embodiment, in order to obtain the first face image and the second face image more accurately, an angle contour may be displayed on the display device. The user needs to put the face into the contour to obtain a face image of an angle, and then another angle contour may be displayed, and the user needs to put the face into the contour to obtain a face image of another angle. The images of the two angles obtained in this manner are more in line with expectations, which can improve the accuracy of the calculation. In one embodiment, a capturing position such as an aperture or a red dot may be displayed on the display device. The user needs to keep his face still and move the aperture or the red dot to the center of the mobile phone, and capture images from two angles. The images captured in this manner have relatively fixed parameters, such as a distance from the lens to the face, a translation distance, and the like, which can improve the calculation efficiency.

Figure 4:
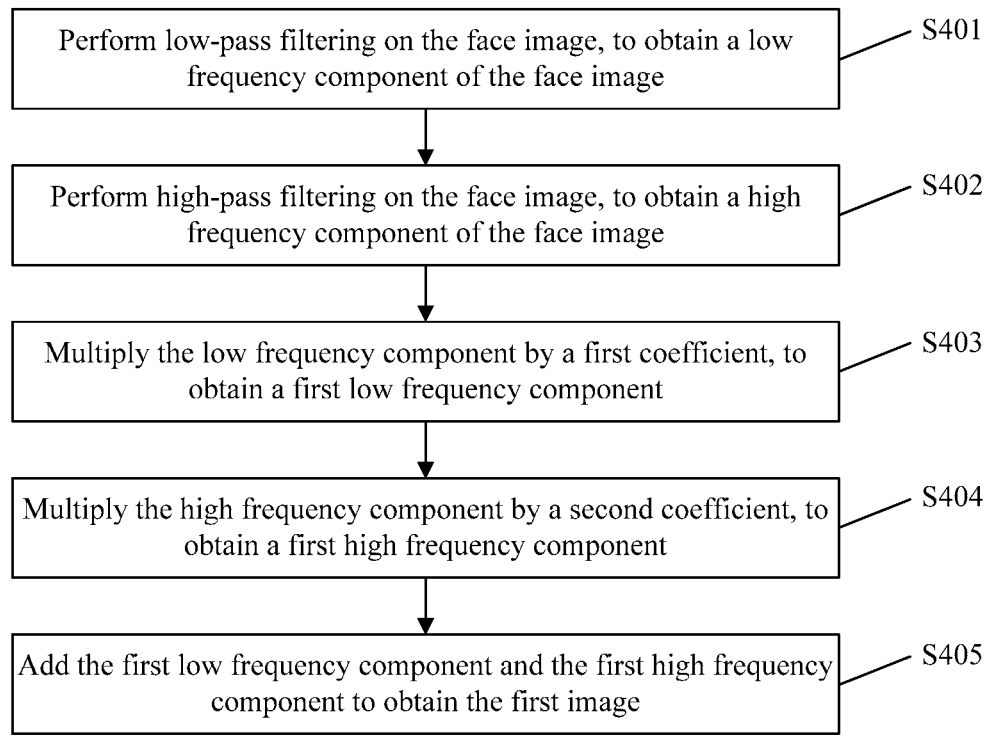
FIG. 4 is a flow chart of an optional implementation of step S103 in the embodiment shown in FIG. 1.

FIG. 4 is a flow chart of the first processing in the face image processing method according to another embodiment of the present disclosure. As shown in FIG. 4, the first processing may include the following steps S401 to S405.

In step S401, low-pass filtering is performed on the face image, to obtain a low frequency component of the face image.

In step S402, high-pass filtering is performed on the face image, to obtain a high frequency component of the face image.

In step S403, the low frequency component is multiplied by a first coefficient, to obtain a first low frequency component.

In step S404, the high frequency component is multiplied by a second coefficient, to obtain a first high frequency component.

In step S405, the first low frequency component and the first high frequency component are added to obtain the first image.

In this embodiment, the low-pass filtering may be the low-pass filtering in the foregoing embodiment or may be performed by using any low-pass filtering method in the conventional technology, and the high-pass filtering may be performed by using any high-pass filtering method in the conventional technology. The core idea of this embodiment of the first processing is to set weights for the result of the low-pass filtering and the result of the high-pass filtering, and add the weighted results. The user can control the result of the first processing by using the first coefficient and the second coefficient In this embodiment, the image region on which the low-pass filtering or the high-pass filtering is to be performed may be selected. For example, the face contour region may be selected for high-pass filtering, and the nose, the mouth, and cheeks may be selected for low-pass filtering. The high frequency component is multiplied by a coefficient less than 1, and the low frequency component is multiplied by a coefficient greater than 1. In an embodiment, different coefficients may be set for different regions, such as a coefficient of 1 for the nose, a coefficient of 1.5 for the mouth, and a coefficient of 1.2 for the cheeks, and a coefficient of 0.5 for the face contour. In an embodiment, an interface for setting the coefficient is provided, which may be a visual interface in an implementation, such as a sliding control, which is generated for each region for setting the coefficient for the region.

A face image processing apparatus according to one or more embodiments of the present disclosure is described in detail below. Those skilled in the art can understand that the face image processing apparatus can be configured by using existing hardware components according to the steps taught in the present disclosure.

Figure 5:
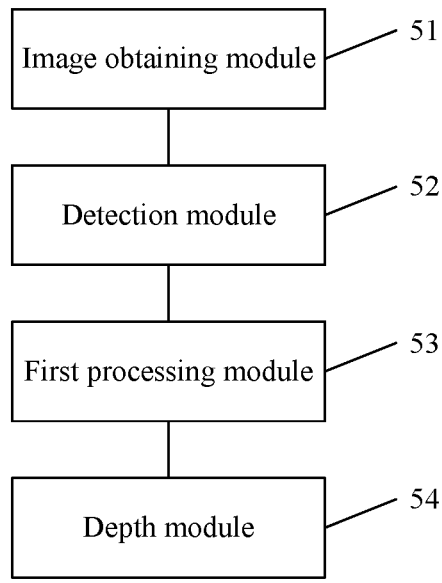
FIG. 5 is a schematic structural diagram of a face image processing apparatus according to a first embodiment of the present disclosure.

FIG. 5 is a schematic structural diagram of a face image processing apparatus according to a first embodiment of the present disclosure. As shown in FIG. 6, the apparatus includes an image obtaining module 51, a detection module 52, a first processing module 53, and a depth module 54.

The image obtaining module 51 is configured to obtain a to-be-processed image.

The detection module 52 is configured to determine if a face image is detected in the to-be-processed image.

The first processing module 53 is configured to, in response a detected face image, perform a first processing on the face image, to obtain a first image.

The depth module 54 is configured to obtain depth information, and add the depth information to the first image, to obtain a processed image.

The apparatus shown in FIG. 5 may perform the method of the embodiment shown in FIG. 1. For the parts that are not described in detail in this embodiment, reference can be made to the related description of the embodiment shown in FIG. 1. For the implementation process and technical effect of the technical solution, reference can be made to the description in the embodiment shown in FIG. 1, and the details are not repeated here.

Figure 6A:
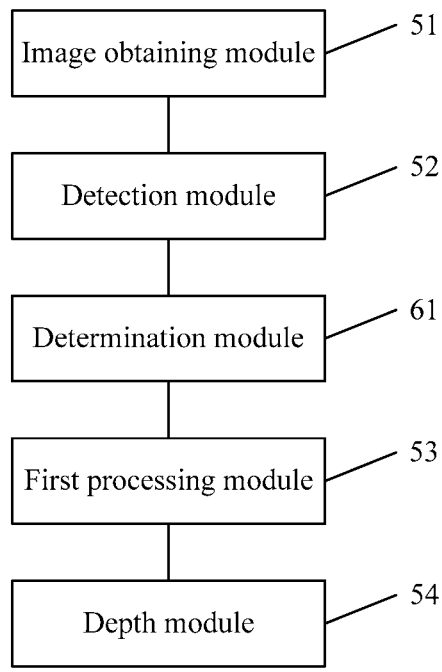
FIG. 6*a* is a schematic structural diagram of a face image processing apparatus according to a second embodiment of the present disclosure.

FIG. 6a-6e are schematic structural diagrams of the face image processing apparatus and the modules according to a second embodiment of the present disclosure. As shown in FIG. 6a, based on the embodiment shown in FIG. 5, the apparatus further includes a determination module 61.

The determination module 61 is configured to determine a face image region on which the first processing is to be performed.

Figure 6B:
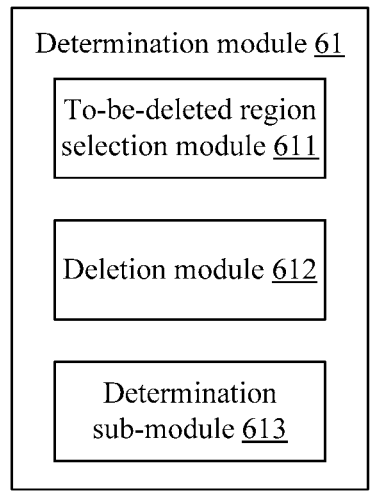
FIG. 6*b* is a schematic structural diagram of the determination module in the face image processing apparatus according to the second embodiment of the present disclosure.

As shown in FIG. 6b, the determination module 61 includes a to-be-deleted region selection module 611, a deletion module 612, a determination sub-module 613.

The to-be-deleted region selection module 611 is configured to select a face region that is to be deleted.

The deletion module 612 is configured to delete the selected face region.

The determination sub-module 613 is configured to determine a remaining face region after the deleting is performed as the face image region on which the first processing is to be performed.

Figure 6C:
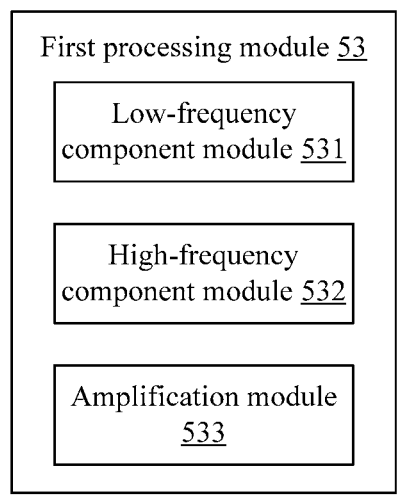
FIG. 6*c* is a schematic structural diagram of the first processing module in the face image processing apparatus according to the second embodiment of the present disclosure.

In this embodiment, as shown in FIG. 6C, the first processing module 53 includes: a low-frequency component module 531, a high-frequency component module 532, and an amplification module 533.

The low-frequency component module 531 is configured to perform low-pass filtering on the face image, to obtain a low frequency component of the face image.

The high-frequency component module 532 is configured to subtract the low frequency component from the face image, to obtain a high frequency component of the face image.

The amplification module 533 is configured to amplify the high frequency component to obtain the first image.

Figure 6D:
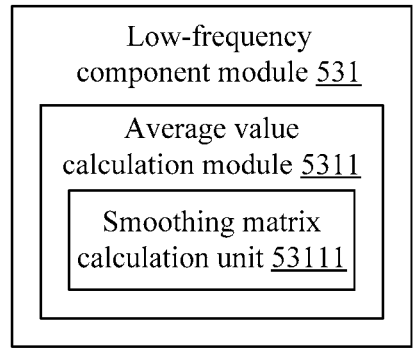
FIG. 6*d* is a schematic structural diagram of the low-frequency component module in the face image processing apparatus according to the second embodiment of the present disclosure.

As shown in FIG. 6d, the low-frequency component module 531 includes: an average value calculation module 5311.

The average value calculation module 5311 is configured to calculate an average value of a value of a current pixel and values of adjacent pixels surrounding the current pixel in the face image, and use the average value as the value of the current pixel.

The average value calculation module 5311 includes a smoothing matrix calculation unit 53111.

The smoothing matrix calculation unit 53111 is configured to convolve the value of the current pixel and the values of the adjacent pixels surrounding the current pixel in the face image with the smoothing matrix, to obtain the average value.

Figure 6E:
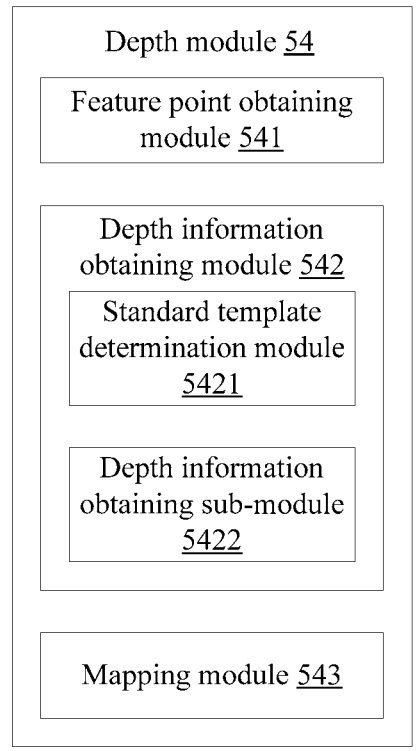
FIG. 6*e* is a schematic structural diagram of the depth module in the face image processing apparatus according to the second embodiment of the present disclosure.

As shown in FIG. 6e, the depth module 54 includes a feature point obtaining module 541, a depth information obtaining module 542, and a mapping module 543.

The feature point obtaining module 541 is configured to obtain a feature point of the face image.

The depth information obtaining module 542 is configured to obtain depth information of the feature point of the face image from a preset standard template.

The mapping module 543 is configured to map the depth information to the feature point of the face image, to obtain the processed image.

The depth information obtaining module 542 includes a standard template determination module 5421 and a depth information obtaining sub-module 5422.

The standard template determination module 5421 is configured to determine a first standard template among preset standard templates, where coordinates of a feature point in the first standard template satisfies a preset relationship with coordinates of the feature point of the face image.

The depth information obtaining sub-module 5422 is configured to obtain the depth information of the feature point in the first standard template.

The apparatus shown in FIGS. 6a to 6e may perform the method according to the embodiment shown in FIG. 2. For the parts that are not described in detail in this embodiment, reference can be made to the related description of the embodiment shown in FIG. 2. For the implementation process and technical effect of the technical solution, reference can be made to the description in the embodiment shown in FIG. 2, and the details are not repeated here.

Figure 7:
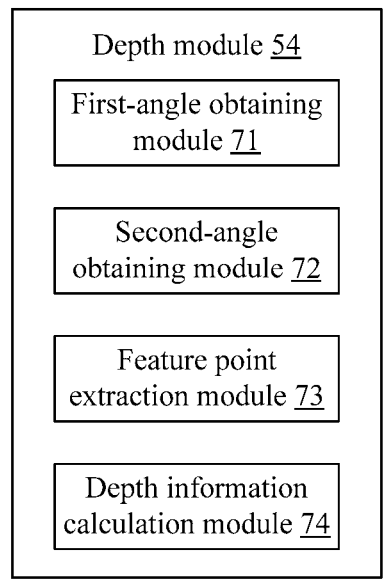
FIG. 7 is a schematic structural diagram of an optional implementation of the depth module in the embodiment shown in FIG. 5.

FIG. 7 is a schematic structural diagram of the depth module 54 in the face image processing apparatus according to an embodiment of the present disclosure. As shown in FIG. 7, based on the above embodiment, the depth module 54 further includes: a first-angle obtaining module 71, a second-angle obtaining module 72, a feature point extraction module 73, and a depth information calculation module 74.

The first-angle obtaining module 71 is configured to obtain a first face image from a first angle.

The second-angle obtaining module 72 is configured to a second face image from a second angle.

The feature point extraction module 73 is configured to extract feature points by using the first face image and the second face image.

The depth information calculation module 74 is configured to calculate depth information of the feature points by using the first face image and the second face image.

The apparatus shown in FIG. 7 may perform the method according to the embodiment shown in FIG. 3. For the parts that are not described in detail in this embodiment, reference can be made to the related description of the embodiment shown in FIG. 3. For the implementation process and technical effect of the technical solution, reference can be made to the description in the embodiment shown in FIG. 3, and the details are not repeated here.

Figure 8:
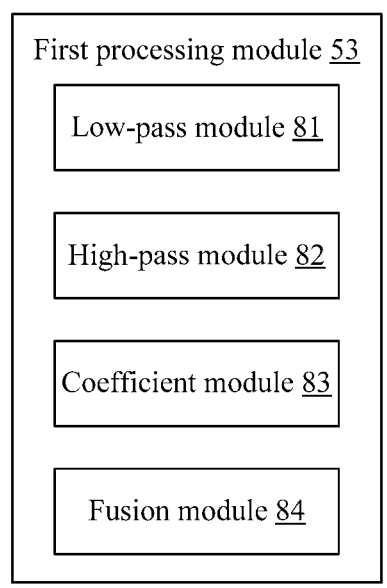
FIG. 8 is a schematic structural diagram of an optional implementation of the first processing module in the embodiment shown in FIG. 5.

FIG. 8 is a schematic structural diagram of the first processing module 53 in the face image processing apparatus according to an embodiment of the present disclosure. As shown in FIG. 8, based on the above embodiment, the first processing module 53 further includes: a low-pass module 81, a high-pass module 82, a coefficient module 83, and a fusion module 84.

The low-pass module 81 is configured to perform low-pass filtering on the face image, to obtain a low frequency component of the face image.

The high-pass module 82 is configured to perform high-pass filtering on the face image, to obtain a high frequency component of the face image.

The coefficient module 83 is configured to multiply the low frequency component by a first coefficient, to obtain a first low frequency component, and multiply the high frequency component by a second coefficient, to obtain a first high frequency component.

The fusion module 84 is configured to add the first low frequency component and the first high frequency component to obtain the first image.

The apparatus shown in FIG. 8 may perform the method according to the embodiment shown in FIG. 4. For the parts that are not described in detail in this embodiment, reference can be made to the related description of the embodiment shown in FIG. 4. For the implementation process and technical effect of the technical solution, reference can be made to the description in the embodiment shown in FIG. 4, and the details are not repeated here.

Figure 9:
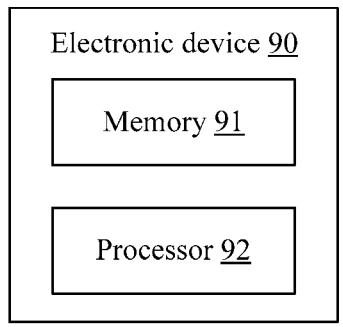
FIG. 9 is a schematic structural diagram of an electronic device according to an embodiment of the present disclosure.

FIG. 9 is a hardware block diagram illustrating an electronic device according to an embodiment of the present disclosure. As shown in FIG. 9, the electronic device 90 according to an embodiment of the present disclosure includes a memory 91 and a processor 92.

The memory 91 is configured to store non-transitory computer-readable instructions. The memory 91 may include one or more computer program products, which may include various forms of computer-readable storage media, such as volatile memory and/or non-volatile memory. The volatile memory may include, for example, a random access memory (RAM) and/or a cache memory. The non-volatile memory may include, for example, a read-only memory (ROM), a hard disk, a flash memory, and the like.

The processor 92 may be a central processing unit (CPU) or other form of processing unit having data processing capabilities and/or instruction execution capabilities, and may control other components in the electronic device 90 to perform desired functions. In an embodiment of the present disclosure, the processor 92 is configured to run the computer-readable instructions stored in the memory 91, to cause the electronic device 90 to execute all or some of the steps of the face image processing method according to the foregoing embodiments of the present disclosure.

Those skilled in the art should understand that, in order to solve the technical problem of how to obtain a good user experience, this embodiment may also include well-known structures such as a communication bus and an interface. These well-known structures should also be included in the protection scope of the present disclosure.

For detailed descriptions of this embodiment, reference may be made to corresponding descriptions in the foregoing embodiments, and details are not repeated here.

Figure 10:
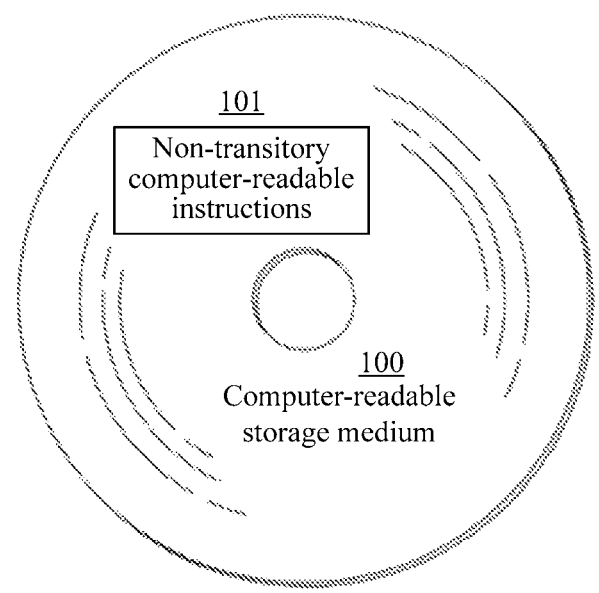
FIG. 10 is a schematic structural diagram of a computer readable storage medium according to an embodiment of the present disclosure.

FIG. 10 is a schematic diagram illustrating a computer-readable storage medium according to an embodiment of the present disclosure. As shown in FIG. 10, a computer-readable storage medium 100 according to an embodiment of the present disclosure has non-transitory computer-readable instructions 101 stored thereon. When the non-transitory computer-readable instruction 101 is executed by a processor, all or some of the steps of the face image processing method of the foregoing embodiments of the present disclosure are performed.

The computer-readable storage medium 100 includes but is not limited to, an optical storage medium (for example, CD-ROM and DVD), a magneto-optical storage medium (for example, MO), a magnetic storage medium (for example, a tape or a mobile hard disk), a medium with a built-in rewritable non-volatile memory (for example: a memory card) and a medium with built-in ROM (for example: a ROM box).

For detailed descriptions of this embodiment, reference may be made to corresponding descriptions in the foregoing embodiments, and the details are not repeated here.

Figure 11:
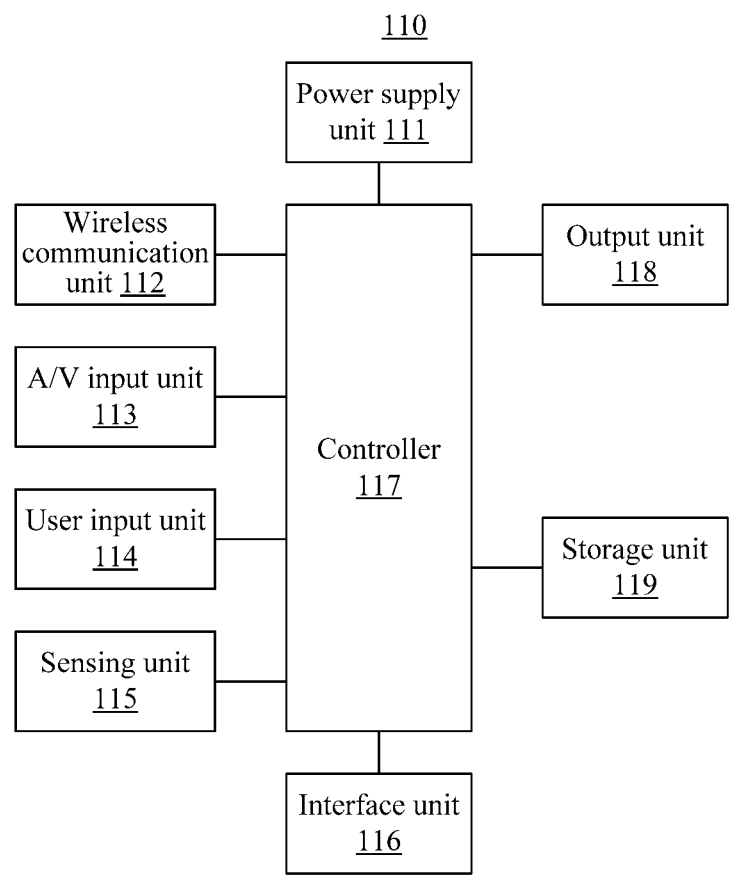
FIG. 11 is a schematic structural diagram of a face image processing terminal according to an embodiment of the present disclosure.

FIG. 11 is a schematic diagram illustrating a hardware structure of a terminal device according to an embodiment of the present disclosure. As shown in FIG. 11, the face image processing method terminal 110 includes the face image processing apparatus according to the above embodiments.

The terminal device may be implemented in various forms, and the terminal device in the present disclosure may include but is not limited to, a mobile terminal device such as a mobile phone, a smart phone, a notebook computer, a digital broadcast receiver, a PDA (personal digital assistant), a PAD (tablet computer), a PMP (portable multimedia players), a navigation device, a vehicle-mounted terminal device, a vehicle-mounted display terminal, a vehicle-mounted electronic rear-view mirror, and the like, and a fixed terminal device such as a digital TV, a desktop computer, and the like.

As an equivalent alternative implementation, the terminal may further include other components. As shown in FIG. 11, the face image processing method terminal 110 may include a power supply unit 111, a wireless communication unit 112, an A/V (audio/video) input unit 113, a user input unit 114, a sensing unit 115, an interface unit 116, a controller 117, an output unit 118, a storage unit 119, and the like. FIG. 11 shows a terminal with various components, but it should be understood that it is not required to implement all of the illustrated components, and that more or fewer components may be implemented instead.

The wireless communication unit 112 allows radio communication between the terminal 110 and a wireless communication system or a network. The A/V input unit 113 is configured to receive audio or video signals. The user input unit 114 may generate key input data according to a command inputted by the user to control various operations of the terminal device. The sensing unit 115 detects a current state of the terminal 110, a position of the terminal 110, presence or absence of a touch input by the user to the terminal 110, an orientation of the terminal 110, an acceleration or deceleration movement and a direction of the terminal 110, and the like, and generates a command or a signal for controlling the operation of the terminal 110. The interface unit 116 serves as an interface through which at least one external device can connect with the terminal 110.

The output unit 118 is configured to provide an output signal in a visual, audio, and/or tactile manner. The storage unit 119 may store software programs and the like for processing and control operations performed by the controller 117, or may temporarily store data that has been outputted or is to be outputted. The storage unit 119 may include at least one type of storage medium. Moreover, the terminal 110 may cooperate with a network storage device that performs a storage function of the storage unit 119 through a network connection. The controller 117 generally controls an overall operation of the terminal device. In addition, the controller 117 may include a multimedia module for reproducing or playing back multimedia data. The controller 117 may perform a pattern recognition process to recognize a handwriting input or a picture drawing input performed on the touch screen as characters or images. The power supply unit 111 receives external power or internal power under the control of the controller 117 and provides appropriate power required to operate various elements and components.

The face image processing method according to various embodiments of the present disclosure may be implemented using a computer-readable medium such as computer software, hardware, or any combination thereof. For hardware implementation, the face image processing method according to various embodiments of the present disclosure may be implemented by using at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, an electronic unit designed to perform the functions described herein. In some cases, the face image processing method according to various embodiments of the present disclosure may be implemented in the controller 117. For software implementation, the face image processing method according to various embodiments of the present disclosure may be implemented with a separate software module that allows execution of at least one function or operation. The software codes may be implemented by a software application (or program) written in any suitable programming language, and the software codes may be stored in the storage unit 119 and executed by the controller 117.

For detailed descriptions of this embodiment, reference may be made to corresponding descriptions in the foregoing embodiments, and the details are not repeated here.

The basic principles of the present disclosure have been described above in conjunction with specific embodiments, but it should be noted that the advantages, effects, and the like mentioned in the present disclosure are merely examples and not limitations, and these advantages, effects, and the like cannot be considered as required for various embodiments of the present disclosure. In addition, the specific details of the above disclosure are merely for the purpose of illustration and ease of understanding, and are not limiting, and the above details do not limit the present disclosure to the implementation of the above specific details.

The block diagrams of the devices, apparatuses, equipment, and systems involved in the present disclosure are only illustrative examples and are not intended to require or imply that they must be connected, arranged, and configured in the manner shown in the block diagrams. As those skilled in the art would realize, these devices, apparatuses, equipment, and systems may be connected, arranged, and configured in any manner. Terms such as "including", "comprising", "having" and the like are open words, meaning "including, but not limited to," and can be used interchangeably therewith. As used herein, the terms "or" and "and" refer to the terms "and/or" and are used interchangeably unless the context clearly indicates otherwise. The term "such as" as used herein refers to the phrase "such as, but not limited to" and is used interchangeably therewith.

In addition, as used herein, "or" used in an enumeration of items beginning with "at least one" indicates a separate enumeration such that, for example, an "at least one of A, B, or C" enumeration means A or B or C, or AB or AC or BC, or ABC (that is, A and B and C). Furthermore, the word "exemplary" does not mean that the described example is preferred or better than other examples.

It should also be noted that, in the system and method of the present disclosure, components or steps can be disassembled and/or recombined. These decompositions and/or recombinations should be considered as equivalent solutions of the present disclosure.

Various changes, substitutions, and alterations to the techniques described herein can be made without departing from the techniques taught by the claims defined below. Further, the scope of the claims of the present disclosure is not limited to the specific aspects of the processes, machines, manufacture, composition of events, means, methods, and actions described above. Processes, machines, manufacture, composition of events, means, methods, and actions that currently exists or is to be developed at a later time may be utilized to perform substantially the same functions or achieve substantially the same results as the corresponding aspects described herein. Accordingly, the appended claims include within their scope such processes, machines, manufacture, compositions of events, means, methods, or actions.

The above description of the disclosed aspects is provided to enable any person skilled in the art to make or use the present disclosure. Various modifications to these aspects will be readily apparent to those skilled in the art, and the general principles defined herein may be applied to other aspects without departing from the scope of the present disclosure. Accordingly, the disclosure is not intended to be limited to the aspects shown herein, but to the broadest scope consistent with the principles and novel features disclosed herein.

The foregoing description has been given for the purposes of illustration and description. Furthermore, this description is not intended to limit the embodiments of the present disclosure to the forms disclosed herein. Although a number of example aspects and embodiments have been discussed above, those skilled in the art will recognize certain variations, modifications, changes, additions and sub-combinations thereof.

The invention claimed is:

1. A face image processing method, comprising:
obtaining a to-be-processed image;
determining if a face image is detected in the to-be-processed image;
in response to a detected face image, performing first processing on the face image to obtain a first image;
obtaining feature points of the first image;
determining a first standard template among at least two preset standard templates based at least in part on the feature points of the first image, wherein the at least two preset standard templates comprise a plurality of standard templates corresponding to a plurality of face images captured at different angles, each of the plurality of standard templates comprises feature points and their respective depth information, the first standard template is divided in a same manner as the first image is divided, each feature point in the first standard template has a corresponding feature point in the first image, and differences between coordinates of each feature point in the first standard template and coordinates of the corresponding feature point in the first image satisfy a preset relationship;

determining depth information of the feature points of the first image based on depth information comprised in the first standard template; and adding the determined depth information to the first image to obtain a processed image.

2. The face image processing method according to claim 1, wherein before the performing first processing on the face image, the method further comprises:

determining a face image region on which the first processing is to be performed.

3. The face image processing method according to claim 2, wherein the determining a face image region on which the first processing is to be performed comprises:

selecting a face region that is to be deleted;

deleting the selected face region; and determining a remaining face region after the deleting is performed as the face image region on which the first processing is to be performed.

4. The face image processing method according to claim 1, wherein the performing first processing on the face image to obtain a first image comprises:

performing low-pass filtering on the face image, to obtain a low frequency component of the face image;

subtracting the low frequency component from the face image, to obtain a high frequency component of the face image; and amplifying the high frequency component to obtain the first image.

5. The face image processing method according to claim 4, wherein the low-pass filtering comprises:

calculating an average value of a value of a current pixel and values of adjacent pixels surrounding the current pixel in the face image, and using the average value as the value of the current pixel.

6. The face image processing method according to claim 5, wherein the calculating the average value comprises:

obtaining a smoothing matrix, and convolving the value of the current pixel and the values of the adjacent pixels surrounding the current pixel in the face image with the smoothing matrix, to obtain the average value.

7. The face image processing method according to claim 6, wherein the smoothing matrix is a two-dimensional matrix, and elements in the two-dimensional matrix are arranged in a manner that values of the elements decreases from a center to a periphery of the two-dimensional matrix.

8. A face image processing apparatus, comprising:

at least one processor; and at least one memory communicatively coupled to the at least one processor and storing instructions that upon execution by the at least one processor cause the face image processing apparatus to perform operations comprising:

obtaining a to-be-processed image;

determining if a face image is detected in the to-be-processed image;

in response to a detected face image, performing first processing on the face image, to obtain a first image;

obtaining feature points of the first image;

determining a first standard template among at least two preset standard templates based at least in part on the feature points of the first image, wherein the at least two preset standard templates comprise a plurality of standard templates corresponding to a plurality of face images captured at different angles, each of the plurality of standard templates comprises feature points and their respective depth information, the first standard template is divided in a same manner as the first image is divided, each feature point in the first standard template has a corresponding feature point in the first image, and differences between coordinates of each feature point in the first standard template and coordinates of the corresponding feature point in the first image satisfy a preset relationship;

determining depth information of the feature points of the first image based on depth information comprised in the first standard template; and adding the determined depth information to the first image to obtain a processed image.

9. The face image processing apparatus according to claim 8, wherein before performing first processing on the face image, the at least one memory further stores instructions that upon execution by the at least one processor cause the face image processing apparatus to further perform operations comprising:

determining a face image region on which the first processing is to be performed.

10. The face image processing apparatus according to claim 9, wherein the determining a face image region on which the first processing is to be performed comprises:

selecting a face region that is to be deleted;

deleting the selected face region; and determining a remaining face region after the deleting is performed as the face image region on which the first processing is to be performed.

11. The face image processing apparatus according to claim 8, wherein the performing first processing on the face image, to obtain a first image comprises:

performing low-pass filtering on the face image, to obtain a low frequency component of the face image;

subtracting the low frequency component from the face image, to obtain a high frequency component of the face image; and amplifying the high frequency component to obtain the first image.

12. The face image processing apparatus according to claim 11, wherein the low-pass filtering comprises:

calculating an average value of a value of a current pixel and values of adjacent pixels surrounding the current pixel in the face image, and using the average value as the value of the current pixel.

13. The face image processing apparatus according to claim 12, wherein the calculating the average value comprises:

obtaining a smoothing matrix, and convolving the value of the current pixel and the values of the adjacent pixels surrounding the current pixel in the face image with the smoothing matrix, to obtain the average value.

14. The face image processing apparatus according to claim 13, wherein the smoothing matrix is a two-dimensional matrix, and elements in the two-dimensional matrix are arranged in a manner that values of the elements decreases from a center to a periphery of the two-dimensional matrix.

15. A non-transient computer-readable storage medium, storing computer instructions, the computer instructions are configured to cause a computer to perform operations comprising:

obtaining a to-be-processed image;

determining whether a face image is detected in the to-be-processed image;

in response to a detected face image, performing first processing on the face image to obtain a first image;

obtaining feature points of the first image;

determining a first standard template among at least two preset standard templates based at least in part on the feature points of the first image, wherein the at least two preset standard templates comprise a plurality of standard templates corresponding to a plurality of face images captured at different angles, each of the plurality of standard templates comprises feature points and their respective depth information, the first standard template is divided in a same manner as the first image is divided, each feature point in the first standard template has a corresponding feature point in the first image, and differences between coordinates of each feature point in the first standard template and coordinates of the corresponding feature point in the first image satisfy a preset relationship;

determining depth information of the feature points of the first image based on depth information comprised in the first standard template; and adding the determined depth information to the first image to obtain a processed image.

16. The non-transient computer-readable storage medium of claim 15, wherein before the performing first processing on the face image, the operations further comprise:

determining a face image region on which the first processing is to be performed.

17. The non-transient computer-readable storage medium of claim 16, wherein the determining a face image region on which the first processing is to be performed further comprises:

selecting a face region that is to be deleted;

deleting the selected face region; and determining a remaining face region after the deleting is performed as the face image region on which the first processing is to be performed.

18. The non-transient computer-readable storage medium of claim 15, wherein the performing first processing on the face image to obtain a first image further comprises:

performing low-pass filtering on the face image, to obtain a low frequency component of the face image;

subtracting the low frequency component from the face image, to obtain a high frequency component of the face image; and amplifying the high frequency component to obtain the first image.

19. The non-transient computer-readable storage medium of claim 15, wherein the operations further comprise:

calculating an average value of a value of a current pixel and values of adjacent pixels surrounding the current pixel in the face image, and using the average value as the value of the current pixel; and obtaining a smoothing matrix, and convolving the value of the current pixel and the values of the adjacent pixels surrounding the current pixel in the face image with the smoothing matrix to obtain the average value.

20. The non-transient computer-readable storage medium of claim 19, wherein the smoothing matrix is a two-dimensional matrix, and elements in the two-dimensional matrix are arranged in a manner that values of the elements decreases from a center to a periphery of the two-dimensional matrix.

* * * * *